(12) United States Patent
Kim et al.

(10) Patent No.: US 8,780,296 B2
(45) Date of Patent: Jul. 15, 2014

(54) DISPLAY DEVICE COMPRISING A LOWER RECEPTACLE THAT INCLUDES UNITARY INDIVISIBLE FIRST AND SECOND RECEIVING PORTIONS AND A LIGHT SOURCE UNIT DISPOSED BETWEEN AN INTERMEDIATE FRAME AND THE LOWER RECEPTACLE

(75) Inventors: Chang-Hoi Kim, Gwangmyeong-si (KR); Jung-Soo Ok, Asan-si (KR); Choong-Yull Kwak, Seoul (KR); Yong-Woo Kim, Seoul (KR); Kyu-Hun Lim, Chungcheongnam-do (KR); Hyo-Chul Lee, Uijeongbu-si (KR)

(73) Assignee: Samsung Display Co., Ltd. (KR)

( * ) Notice: Subject to any disclaimer, the term of this patent is extended or adjusted under 35 U.S.C. 154(b) by 289 days.

(21) Appl. No.: 12/854,916

(22) Filed: Aug. 12, 2010

(65) Prior Publication Data

US 2011/0037920 A1    Feb. 17, 2011

(30) Foreign Application Priority Data

Aug. 12, 2009   (KR) .................. 10-2009-0074383

(51) Int. Cl.
*G02F 1/1335* (2006.01)
*G09F 13/04* (2006.01)
*F21V 7/04* (2006.01)

(52) U.S. Cl.
USPC ............. 349/65; 362/97.3; 362/612; 362/632

(58) Field of Classification Search
USPC ............... 349/61–65, 67, 70; 362/97.1–97.4, 362/612–615, 632, 634
See application file for complete search history.

(56) References Cited

U.S. PATENT DOCUMENTS

| 2005/0225708 | A1* | 10/2005 | Oke et al. ................ 349/139 |
| 2008/0088763 | A1* | 4/2008 | Toriyama et al. ............... 349/58 |
| 2008/0158473 | A1* | 7/2008 | Liang .............. 349/60 |
| 2009/0195726 | A1* | 8/2009 | Na et al. .............. 349/58 |

FOREIGN PATENT DOCUMENTS

| JP | 07-181484 A | 7/1995 |
| JP | 2006-108074 A | 4/2006 |
| JP | 2008-218039 A | 9/2008 |

* cited by examiner

*Primary Examiner* — Paul Lee
(74) *Attorney, Agent, or Firm* — Cantor Colburn LLP

(57) ABSTRACT

A display device including a display panel which displays images, an intermediate frame on which the display panel is seated, a lower receptacle which includes a first receiving portion including a bottom plate and sidewalls, and a second receiving portion separate from the first receiving portion, and a light source unit which includes an alignment plate and a point light source mounted on the alignment plate. The light source unit contacts the sidewalls of the lower receptacle, and the first receiving portion is coupled with the intermediate frame.

18 Claims, 18 Drawing Sheets

DISPLAY DEVICE COMPRISING A LOWER RECEPTACLE THAT INCLUDES UNITARY INDIVISIBLE FIRST AND SECOND RECEIVING PORTIONS AND A LIGHT SOURCE UNIT DISPOSED BETWEEN AN INTERMEDIATE FRAME AND THE LOWER RECEPTACLE

This application claims priority to Korean Patent Application No. 10-2009-0074383 filed on Aug. 12, 2009, and all the benefits accruing therefrom under 35 U.S.C. §119, the disclosure of which is incorporated herein by reference in its entirety.

BACKGROUND OF THE INVENTION

1. Field of the Invention

The invention relates to a display device, and more particularly, to a display device which enables easy replacement of a light source unit.

2. Description of the Related Art

A liquid crystal display ("LCD"), which is one of the most widely used flat panel displays, typically includes two substrates including field-generating electrodes thereon and a liquid crystal ("LC") layer interposed between the two substrates. To produce images on the LCD, voltage signals are applied to the field-generating electrodes of the substrates to generate an electric field across the LC layer, and thus control the orientation of LC molecules of the LC layer. The controlled orientation of the LC molecules creates the images by adjusting the polarization of incident light.

Since the LCD device is a non-emissive display device that displays images using an external light, the LCD device requires a backlight assembly to provide light passing across the LC layer. A cold cathode fluorescent lamp ("CCFL"), an external electrode fluorescent lamp ("EEFL") or a light emitting diode ("LED") can be used as the light source unit.

In order to increase the service life of the LCD, there has been an increasing need for an improved LCD in which a light source unit can be easily replaced with a new one.

In this regard, when the life span of the related art light source unit has expired, the entire backlight assembly of a display device must be replaced, or the backlight assembly must be disassembled prior to replacement of the light source unit. Thus, in order to ensure easy maintenance of a display device and cost effectiveness, it is necessary to develop techniques for simplifying or easily replacing a light source unit of the display device.

BRIEF SUMMARY OF THE INVENTION

The invention provides a display device which enables easy replacement of a light source unit.

The above and other features of the invention will be described in or be apparent from the following description of the exemplary embodiments.

According to an exemplary embodiment of the invention, there is provided a display device including a display panel which displays images, an intermediate frame on which the display panel is seated, a lower receptacle which includes a first receiving portion including a bottom plate and sidewalls, and a second receiving portion separated from the first receiving portion, and a light source unit which includes an alignment plate and a point light source mounted on the alignment plate. The light source unit contacts the sidewalls, and the first receiving portion is removably disposed with the intermediate frame.

According to an exemplary embodiment of the invention, there is provided a display device including an upper receptacle, a display panel which displays images, an intermediate frame on which the display panel is seated, a lower receptacle which includes sidewalls and a first hole disposed in the sidewalls, and a light source unit which includes an alignment plate and a point light source disposed on the alignment plate. The light source unit is removably coupled with the lower receptacle.

According to an exemplary embodiment of the invention, there is provided a display device including an upper receptacle, a display panel which displays images, an intermediate frame on which the display panel is seated, a lower receptacle which includes a bottom plate, sidewalls extending from the bottom plate, and a second hole disposed in the bottom plate, and a light source unit which includes an alignment plate and a point light source mounted on the alignment plate. The light source unit is removably coupled with the lower receptacle.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Figure 1A:
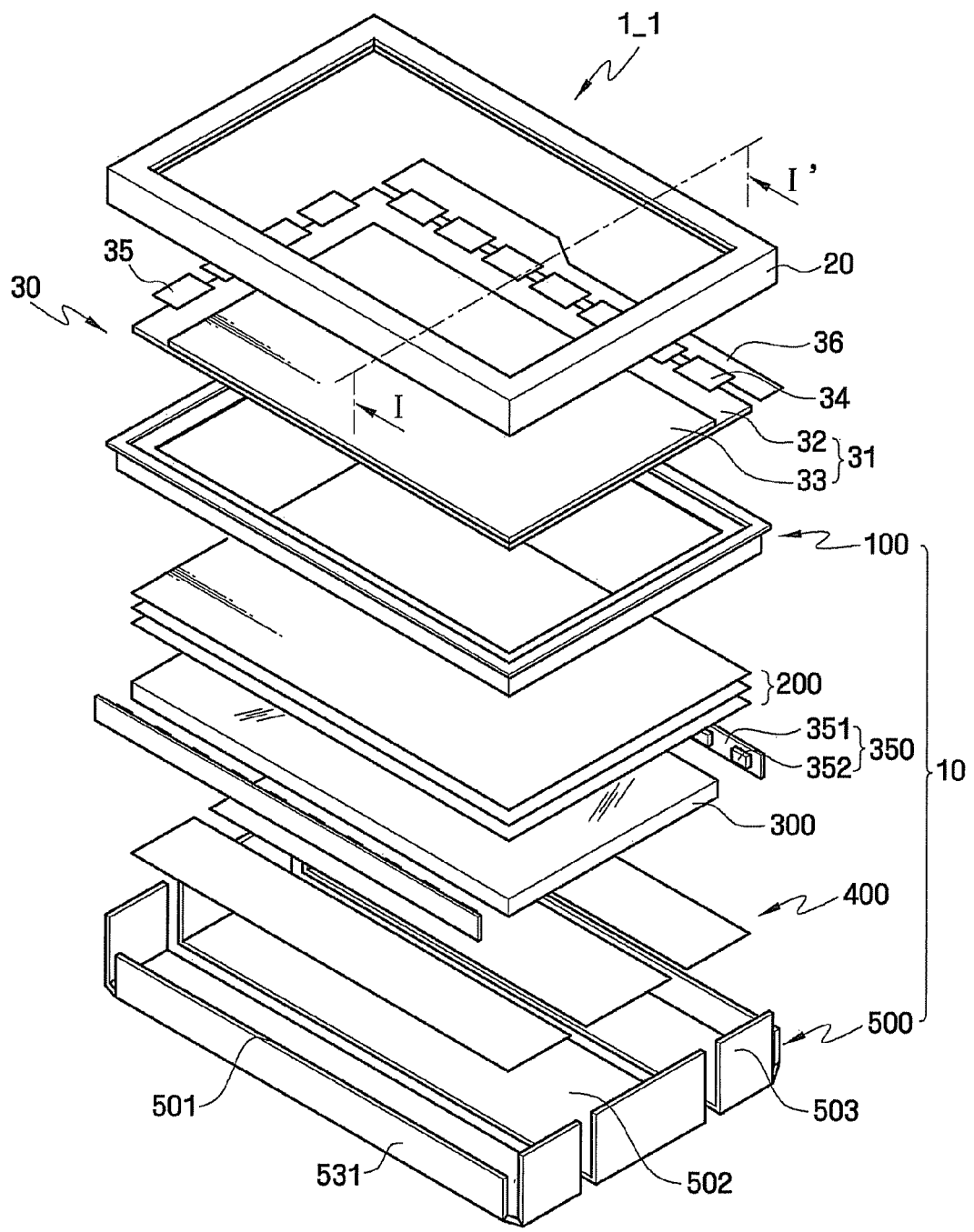
FIG. 1A is an exploded perspective view of an exemplary embodiment of a display device, according to the invention.

Hereinafter, the invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "below" or "lower" and the like may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Hereinafter, a display device according to exemplary embodiments of the invention will be described in detail with reference to FIGS. 1A through 15.

Figure 1B:
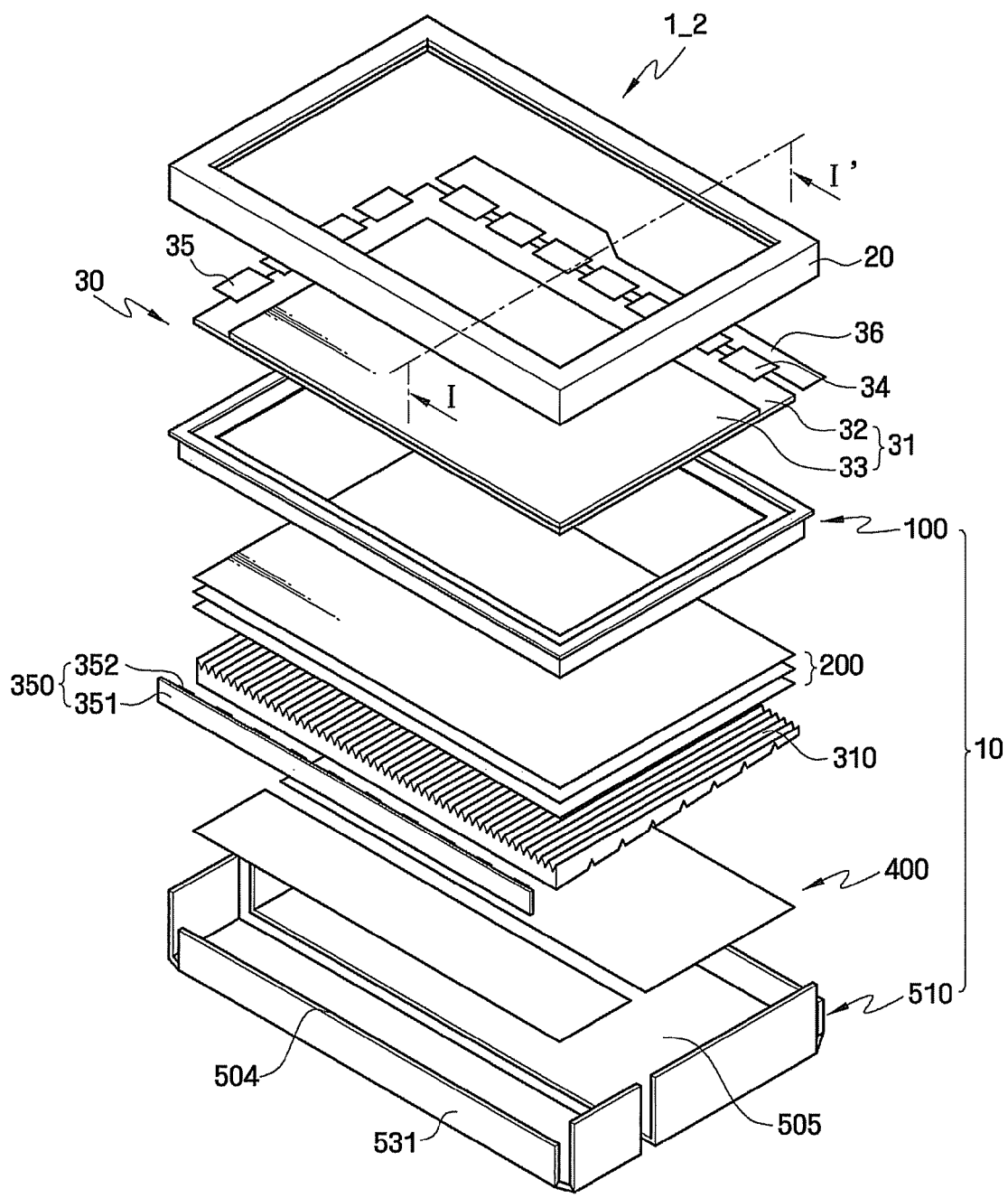
FIG. 1B is an exploded perspective view illustrating a modified exemplary embodiment of the display device shown in FIG. 1A.
Figure 2:
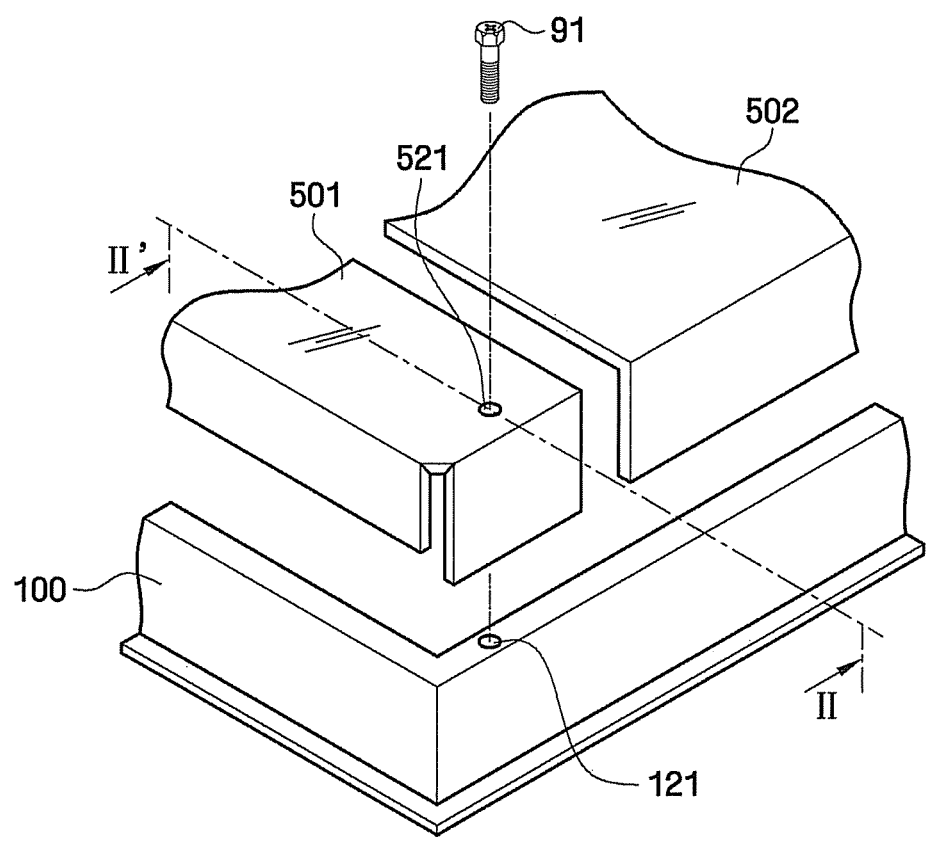
FIG. 2 illustrates an exemplary embodiment of a state where elements of the display device of FIG. 1A are coupled to each other.
Figure 3:
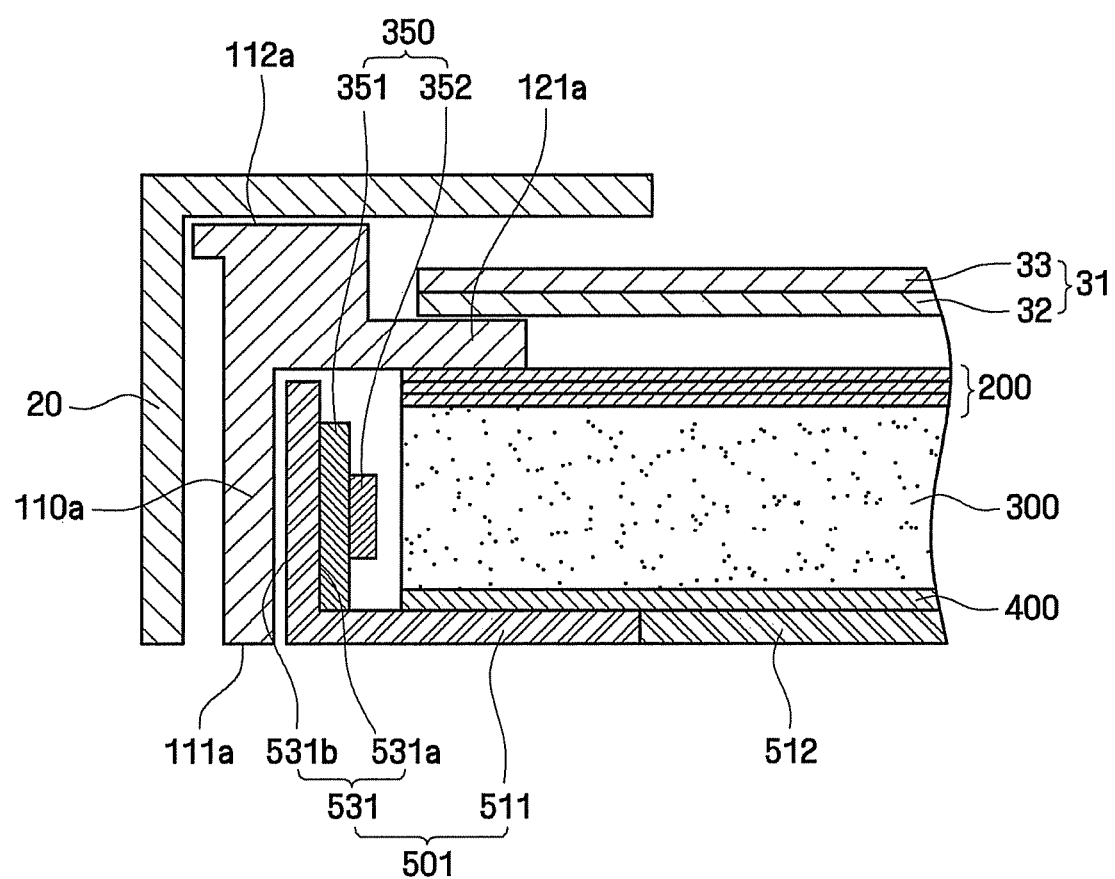
FIG. 3 is a cross-sectional view of the display device taken along line I-I' of FIG. 1A.
Figure 4:
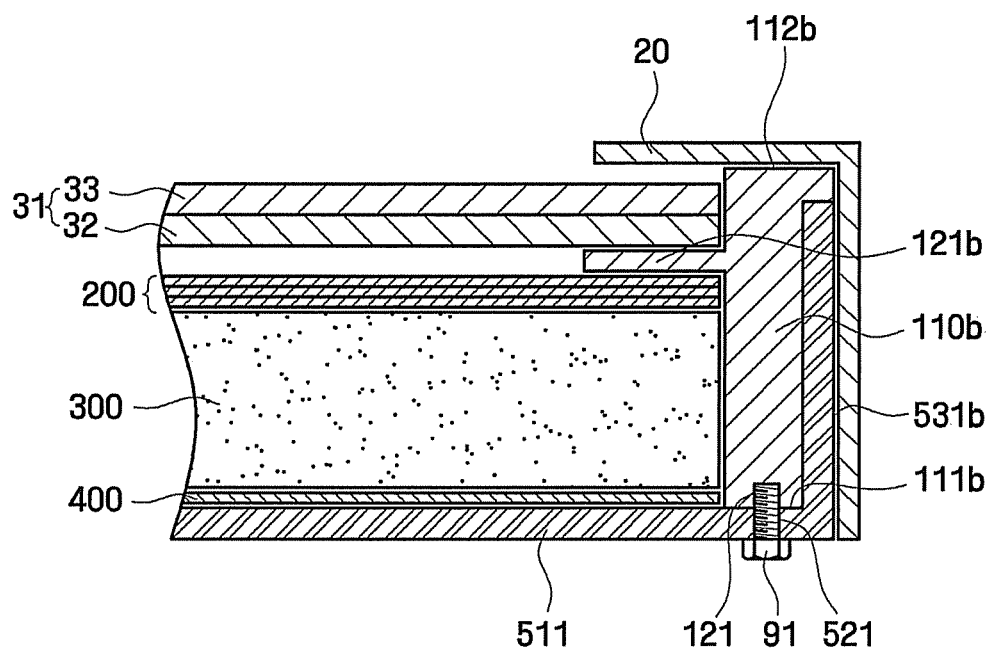
FIG. 4 is a cross-sectional view of the display device taken along line II-II' of FIG. 2.
Figure 5:
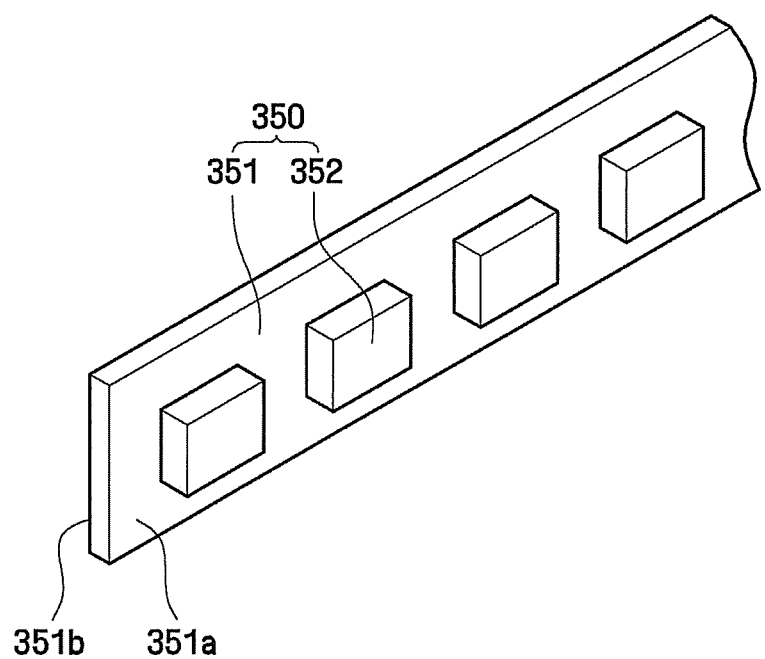
FIG. 5 illustrates an exemplary embodiment of a light source unit of the display device of FIG. 1A.

FIG. 1A is an exploded perspective view of an exemplary embodiment of a display device according to the invention, FIG. 1B is an exploded perspective view illustrating a modified exemplary embodiment of the display device shown in FIG. 1A, FIG. 2 illustrates an exemplary embodiment of a state where elements of the display device of FIG. 1A are coupled to each other, FIG. 3 is a cross-sectional view of the display device taken along line I-I' of FIG. 1A, FIG. 4 is a cross-sectional view of the display device taken along line II-II' of FIG. 2, and FIG. 5 illustrates an exemplary embodiment of a light source unit of the display device of FIG. 1A.

Referring to FIG. 1A, a display device 1_1 according to the invention includes a display panel assembly 30, an upper receptacle 20 and a backlight assembly 10.

The display panel assembly 30 includes a display panel 31 including a lower substrate 32 and an upper substrate 33, a liquid crystal (not shown), a gate chip film package 35, a data chip film package 34, and a printed circuit board ("PCB") 36.

The display panel 31 includes the lower substrate 32 and the upper substrate 33 that faces the lower substrate 32. The lower substrate 32 is provided with a gate line (not shown), a data line (not shown), a thin film transistor ("TFT") array, a pixel electrode and a common electrode. The upper substrate 33 is provided with a color filter, a black matrix and a common electrode. In an alternative embodiment, the color filter, the black matrix and the common electrode may also be provided on the lower substrate 32.

The gate chip film package 35 is physically and/or electrically connected to each gate line (not shown) disposed on the lower substrate 32, and the data chip film package 34 is physically and/or electrically connected to each data line (not shown) disposed on the lower substrate 32. The gate chip film package 35 and the data chip film package 34 may include wiring patterns in which a semiconductor chip is disposed on a base film and a tape automated bonding ("TAB") tape bonded by a TAB technology. In one exemplary embodiment, a tape carrier package ("TCP") or a chip on film ("COF") may be used as the chip film package. However, the chip film package as described above is merely exemplary, and other alternatives are within the scope of these embodiments.

In an alternative exemplary embodiment, the gate chip film package 35 may not be used, and a gate driver (not shown) may be installed directly on the lower substrate 32 using amorphous silicon.

Various driving components are mounted on the PCB 36. The driving components input a gate driving signal to the gate chip film package 35 and input a data driving signal to the data chip film package 34.

The upper receptacle 20 defines an outermost layer of the display device 1_1 at a front (e.g., viewing) side of the display device, and includes a receiving space in which the display panel assembly 30 is accommodated. An open window, through which an upper surface of the display panel 32 is exposed, is disposed at the central portion of the upper receptacle 20, and the upper receptacle 20 is coupled with a lower receptacle 500, while an intermediate frame 100 is interposed therebetween.

The backlight assembly 10 includes the intermediate frame 100, a plurality of optical sheets 200 (e.g., three), a light guide plate ("LGP") 300, a light source unit 350, and a reflective sheet 400. The LGP 300 is illustrated as a substantially planar member, but the invention is not limited thereto.

Referring to FIGS. 1A and 5, an exemplary embodiment of the light source unit 350 includes at least one point light source 352 that emits light, and an alignment plate 351. A plurality of the point light source 352 is disposed on one surface of the alignment plate 351 facing an inner area of the display device 1_1. The light source unit 350 emits light onto the display panel 31 through the LGP 300. In the illustrated embodiment, a plurality of the light source unit 350 is disposed in the display device 1_1, such as at opposing incident faces of the LGP 300, but the invention is not limited thereto.

Each of the point light sources 352 includes a light emitting unit that emits light. In one exemplary embodiment, a light emitting diode ("LED") may be used as one of the point light sources 352. The LED has excellent color reproducibility and a low power consumption characteristic. The LED may include a frame (not shown) and red, green, and blue light emitting chips (not shown) arranged in the frame. Red light, green light, and blue light, which are emitted from the red, green, and blue light emitting chips, respectively, may be mixed with one another to produce white light. Alternatively, phosphor layers (not shown) are disposed on the red, green, and blue light emitting chips, thereby realizing white light.

The alignment plate 351 may be used to align the point light sources 352 in a predetermined direction in the display device 1_1. The alignment plate 351 includes a first surface 351a and a second surface 351b opposing the first surface 351a. All of the point light sources 352 are mounted on the first surface 351a of the alignment plate 351. In the illustrated embodiment, the plurality of point light sources 352 may be mounted on only the first surface 351a of the alignment plate 351.

As illustrated in FIGS. 1A and 5, the point light sources 352 may be separated from one another by a predetermined distance along a first direction. Also, the point light sources 352 may be aligned, such as substantially linearly, on the alignment plate 351 in a predetermined direction. In an exemplary embodiment of the light source unit 350, the point light source 352 may be mounted on the alignment plate 351 to be parallel to a lengthwise direction of the alignment plate 351.

The alignment plate 351 may supply power to the point light source 352. To this end, the alignment plate 351 may include a circuit (not shown). In other words, the point light source 352 may be physically and/or electrically connected to an external power supply source by a circuit mounted in the alignment plate 351. Thus, the point light source 352 may emit light. As the circuit, the alignment plate 351 may include the PCB, so that the point light source 352 and the external power supply source may be connected to each other. The point light sources 352 mounted on the alignment plate 351 may be electrically connected to one another by the PCB.

In an exemplary embodiment, in order to improve the light emission efficiency of light emitted by the point light source 352, a reflective member (not shown) may be disposed at the first surface 351a of the alignment plate 351 on which the point light sources 352 are mounted.

The LGP 300 guides light emitted from the light source unit 350 to the display panel assembly 30. The LGP 300 may include a transparent plastic material such as acryl. The LGP 300 allows light emitted from the light source unit 350 to proceed in a direction towards the display panel 31 disposed above the LGP 300. The LGP 300 may include a reflective member, such fine dot patterns, disposed on a bottom surface of the LGP 300, to reflect light toward an emission surface of the LGP 300.

The optical sheets 200 are disposed above the LGP 300 (e.g., towards the viewing side of the display device 1_1) to be used to disperse light emitted from the LGP 300 and focus the light. The optical sheets 200 may include at least one of a diffusion sheet, a prism sheet and a protective sheet. Alternatively, the optical sheets 200 may be disposed as a single combined optical sheet capable of functioning as the diffusion sheet, the prism sheet and the protective sheet. In one exemplary embodiment, the single optical sheet 200 may be formed to be capable of dispersing light emitted from the LGP 300 toward a lower portion of the display device 1_1, and a prism pattern (not shown) may be disposed in an upper portion of the optical sheet 200, and a protection layer (not shown) may be disposed on the prism pattern.

A reflective sheet 400 is disposed below the LGP 300 at a rear portion of the display device 1_1, and reflects light emitted from a lower portion of the LGP 300 toward an upper portion of the LGP 300. The reflective sheet 400 is disposed on the lower portion of the LGP 300 and allows light that is not reflected, such as by the fine dot patterns disposed on the bottom surface of the LGP 300, to be reflected toward the emission surface of the LGP 300, thereby reducing a loss of light incident on the display panel 31 and improving uniformity of light transmitted through the emission surface of the LGP 300. The reflective sheet 400 may be disposed between the LGP 300 and the lower receptacle 500 in a separate sheet form and may include a reflective pattern on the lower receptacle 500, such as by coating the lower receptacle 500 with a material having high reflection efficiency.

The lower receptacle 500 may include multiple individual unitary indivisible portions, and the reflective sheet 400 may be divided into individual unitary indivisible portions based on the configuration of the lower receptacle 500. The collective reflective sheet 400 may be divided into multiple individual unitary indivisible portions along a divided lower receptacle 500, and each of the portions of the reflective sheet 400 may be inserted between the LGP 300 and the collective lower receptacle 500.

Referring to FIG. 1A, the reflective sheet 400 may be divided into three portions so as to be adapted to the shape of a first receiving portion 501, the shape of a second receiving portion 502, and the shape of a third receiving portion 503 of the lower receptacle 500, and may be inserted between the LGP 300 and the lower receptacle 500. The "shape" of the receiving portions 501, 502 and 503 of the lower receptacle 500, may include a planar profile defined by the boundaries of the portions, dimensions of the portions and/or arrangement of the portions relative to each other. While a number of the portions of the reflective sheet 400 and the lower receptacle 500 are equal to each other, the invention is not limited thereto.

Referring to FIGS. 1A, 3 and 4, the optical sheets 200 and the LGP 300 are accommodated in the intermediate frame 100. An open window is disposed at the central portion of the intermediate frame 100, and light that has been transmitted through the LGP 300 and the optical sheets 200 may pass through the open window of the intermediate frame 100. The intermediate frame 100 may be disposed in the form of a rectangular frame including the open window. In an exemplary embodiment of a method of manufacturing, the intermediate frame 100 may be formed by molding.

The intermediate frame 100 includes sidewall portions 110*a* and 110*b*, and seating portions 121*a* and 121*b*. The sidewall portion 110*a* and the seating portion 121*a* are longitudinally extended in the first direction, and the sidewall portion 110*b* and the seating portion 121*b* are longitudinally extended in a second direction which is substantially perpendicular to the first direction.

The sidewall portions 110*a* and 110*b* include bottom end portions 111*a* and 111*b*, and top end portions 112*a* and 112*b*, respectively. In the illustrated embodiment, the top end portions 112*a* and 112*b* of the sidewall portions 110*a* and 110*b*, contact the upper receptacle 20. Referring to FIG. 4, the bottom end portion 111*b* is coupled with the lower receptacle 500. This will be described later in detail.

The seating portions 121*a* and 121*b* protrude from insides of the sidewall portions 110*a* and 110*b*, towards the inner area of the display device 1_1. The display panel 31 is seated on the seating portions 121*a* and 121*b*, such that an upper surface of the seating portions 121*a* and 121*b* contact a lower surface of the display panel 31. The optical sheets 200, the LGP 300, and the reflective sheet 400 may be accommodated in a space defined between a bottom surface of the seating portion 121*a* and/or 121*b*, and an upper surface a bottom plate 511 of the first receiving portion and/or 512 of the second receiving portion 502, of the lower receptacle 500. The bottom plates 511 and 512 of the first and second receiving portions 501 and 502 are substantially coplanar with each other, and with a bottom plate of the third receiving portion 503.

Referring to FIGS. 1A, 3 and 4, the lower receptacle 500 includes the first receiving portion 501, the second receiving portion 502, and the third receiving portion 503. The first receiving portion 501 and the second receiving portion 502 are divided along the first direction, and include edge faces disposed facing and contacting each other.

The first receiving portion 501, the second receiving portion 502, and the third receiving portion 503 are coupled with one another to define a receiving space, so that the LGP 300, the optical sheets 200, the reflective sheet 400, and the light source unit 350 may be accommodated in the lower receptacle 500. In an exemplary embodiment of a manufacturing process, the lower receptacle 500 may be manufactured by performing a sheet metal process using a sheet metal.

The first receiving portion 501 includes the bottom plate 511 and a plurality of a sidewall 531. The sidewalls 531 may be formed by bending an end portion of the bottom plate 511 along the first and second directions, such that the plurality of sidewalls 531 and the bottom plate 511 collectively form a unitary indivisible first receiving portion 501. In other words, the sidewall 531 may be continuously extend from the bottom plate 511.

Each of the sidewalls 531 includes an internal surface 531*a* facing the inner area of the display device 1_1, and an external surface 531*b*. In the illustrated embodiment, the light source unit 350 is accommodated in the lower receptacle 500 to be in contact with at least one of the sidewalls 531. In an exemplary embodiment, the light source 350 may contact all of the sidewalls 531. More specifically, the light source unit 350 may be accommodated in the lower receptacle 500, so that the internal surface 531*a* of the sidewall 531 and the second surface 351*b* of the alignment plate 351 of the light source unit 350 may contact each other. Thus, heat generated in the light source unit 350 may be transferred directly to the lower receptacle 500 so that the heat-dissipating capability of the display device may be improved.

When a cover of the light source unit 350 is interposed between the lower receptacle 500 and the light source unit 350, an air layer is formed between the lower receptacle 500 and the cover. Thus, heat generated in the light source unit 350 is not easily transferred to the lower receptacle 500 through the air layer so that the temperature of the light source unit 350 may be increased. Consequently, the life span of the light source unit 350 may be reduced. In contrast, the display device 1_1 according to the illustrated embodiment of the invention, heat generated in the light source unit 350 may be transferred directly to the lower receptacle 500, and the temperature of the light source unit 350 may not rise, thereby reducing or effectively preventing a reduction in the life span of the light source unit 350.

Referring to FIGS. 1A, 2 and 4, the first receiving portion 501 of the lower receptacle 500 is coupled with the intermediate frame 100.

The first receiving portion 501 and the intermediate frame 100 may be coupled with each other in various manners. In an exemplary embodiment, the first receiving portion 501 and the intermediate frame 100 are coupled with each other by means of a fixing member 91, such as a screw, which will now be described.

The first receiving portion 501 includes a first fastening portion 521. The first fastening portion 521 may be disposed in the form of a hole, through which a portion of the first receiving portion 501 is perforated, so that the screw 91 may be coupled with the first fastening portion 521.

The intermediate frame 100 includes a second fastening portion 121 disposed in the bottom end (e.g., face) portion 111*b* of the sidewall portion 110*b*. The screw 91 that has passed through the first fastening portion 521 of the lower receptacle 500, is coupled with the second fastening portion 121 of the intermediate frame 100. Alternatively, the second fastening portion 121 of the intermediate frame may be disposed in the form of a groove, in which a portion of the bottom end portion 111*b* is indented. The first and second fastening portions 521 and 121 may be considered an enclosed opening in the first receiving portion 501 and the sidewall portion 110*b*, respectively, such that the first receiving portion 501 and the sidewall portion 110*b* solely define the enclosed first and second fastening portions 521 and 121. A fastening portion disposed in the form of a groove, extends only partially through a member, in contrast to being disposed penetrating completely through the member.

As a result, the first receiving portion 501 and the intermediate frame 100 may be coupled with each other solely by the first fastening portion 521, the screw 91 and the second fastening portion 121.

As described above, in the display device 1_1 of FIG. 1A, the lower receptacle 500 is divided into separable members of the first receiving portion 501, the second receiving portion 502, and the third receiving portion 503. The separate first receiving portion 501 is coupled with the intermediate frame 100, so that the light source unit 350 accommodated in the first receiving portion 501 may be easily replaced with a new light source unit 350, or portion thereof.

The light source unit 350 may be easily replaced by the following methods, including but not limited to, loosening the coupling of the first receiving portion 501 and the intermediate frame 100, separating the first receiving portion 501 from the intermediate frame 100 by moving the first receiving portion 501 in a downward direction (e.g., towards the rear of the display device 1_1) to completely separate the first receiving portion 501 from the intermediate frame 100, accommodating a new light source unit 350 in the first receiving portion 501, and re-fitting the first receiving portion 501 into the intermediate frame 100. As such, the light source unit 350 may be separated from the intermediate frame 100 downwards, and then may be replaced with a new one. Thus, friction between the light source unit 350 and another element of the display device 1_1 can be minimized, such as when the light source unit 350 is replaced in a lateral direction, thereby achieving the stability of the display device 1_1.

FIG. 1B is an exploded perspective view of a display device 1_2 according to a modified exemplary embodiment of the display device of FIG. 1A. Referring to FIG. 1B, the display device 1_2 according to the illustrated embodiment is substantially the same as the display device 1_1 of FIG. 1A, except that a lower receptacle 510 includes a first receiving portion 504 and a second receiving portion 505, a light source unit 350 is disposed only at one side of a LGP 310, and the LGP 310 is of a wedge type. Thus, repeated descriptions thereof will not be given herein. However, the invention is not limited to the illustrated exemplary embodiment in FIG. 1B, and the LGP 310 may be of a planar type.

The lower receptacle 510 includes multiple individual unitary indivisible first and second receiving portions 504 and 505, and the collective reflective sheet 400 is also divided into individual unitary indivisible portions based on the configuration of the lower receptacle 510, such that the portions of the reflective sheet 400 are inserted between the LGP 310 and the collective lower receptacle 510. Bottom plates of the first and second receiving portions 504 and 505 are substantially coplanar with each other.

The first receiving portion 501 and 504 disposed overlapping the light source unit 350 is removably disposed with the intermediate frame 100, such as by using the fixing member 91 described with respect to the embodiment illustrated in FIGS. 2 and 4. Since the first receiving portion 501 and 504 of the lower receptacle 500 and 510 is detachable from the intermediate frame 100, only a limited portion of the display device 1_1 and 1_2 needs to be disassembled from a remainder of the display device 1_1 and 1_2, to access the light source unit 350. Consequently, the removably coupled first receiving portion 501 and 504 and intermediate frame 100 provides direct access to the light source unit 350 without disassembling or removing a whole of the backlight assembly 10, and any portion of the light source unit 350 may be easily repaired or replaced.

Next, another exemplary embodiment of a display device according to the invention will be described with reference to FIGS. 6A through 9.

Figure 6A:
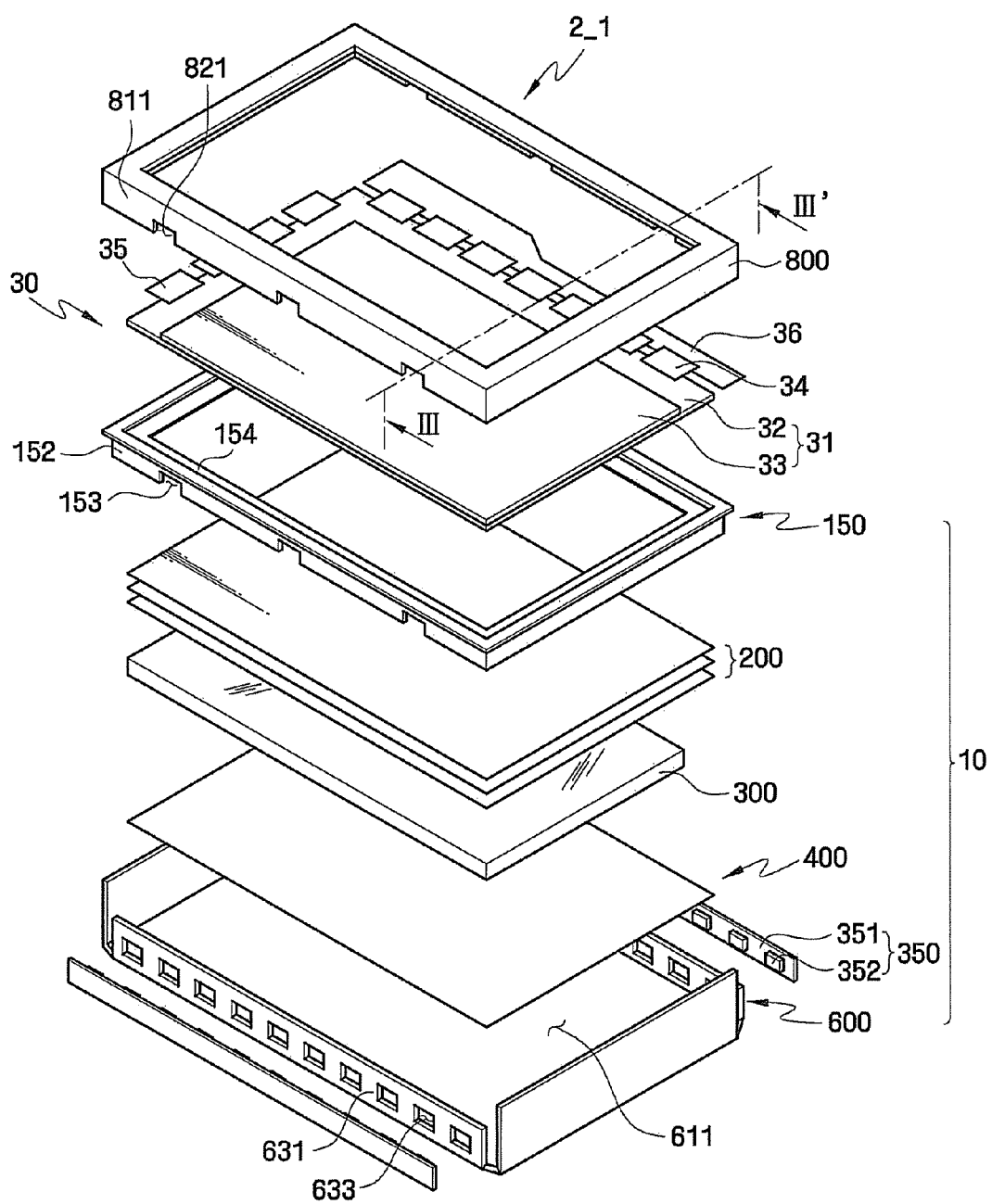
FIG. 6A is an exploded perspective view of another exemplary embodiment of a display device, according to the invention.
Figure 6B:
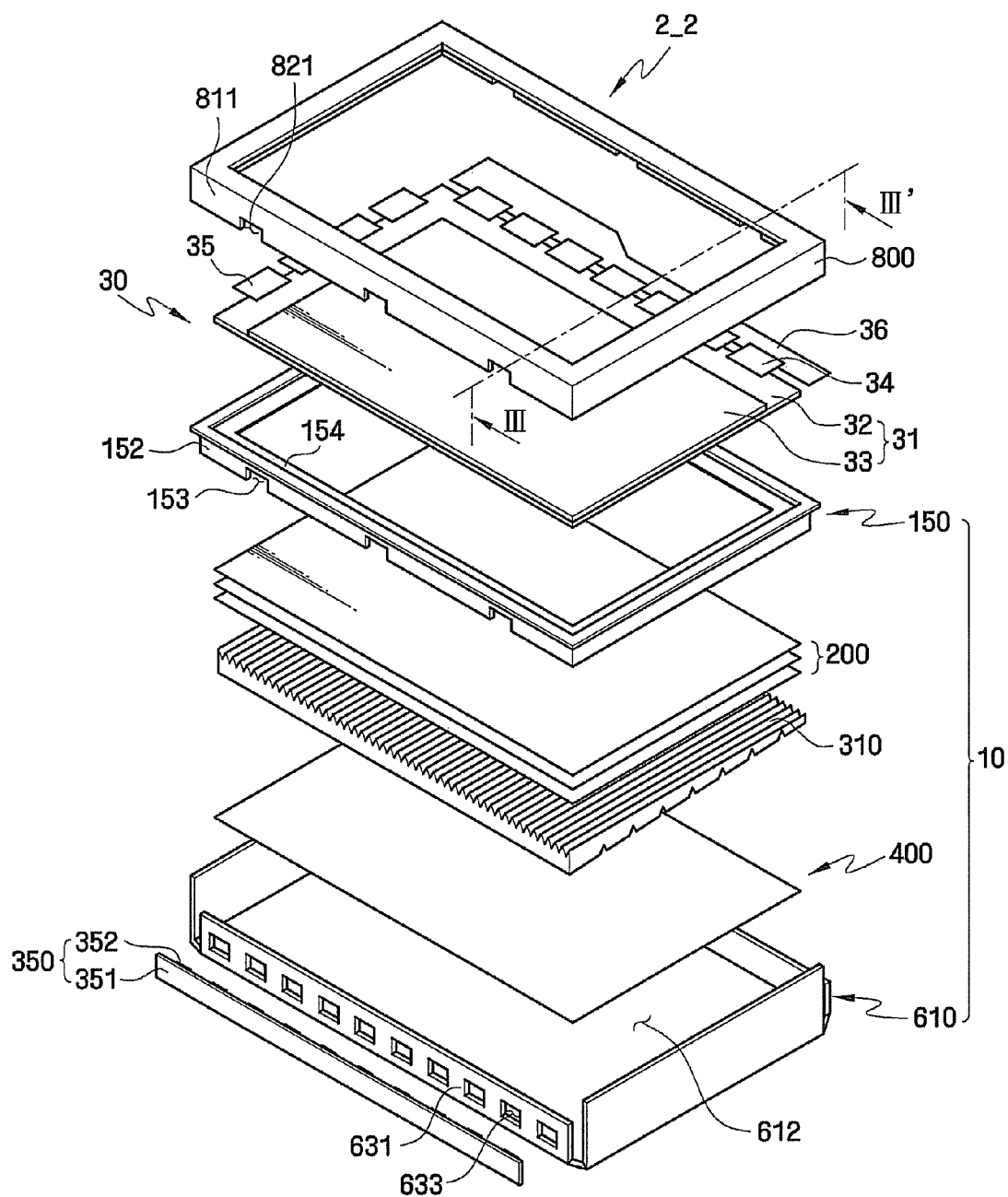
FIG. 6B is an exploded perspective view illustrating a modified exemplary embodiment of the display device shown in FIG. 6A.
Figure 7:
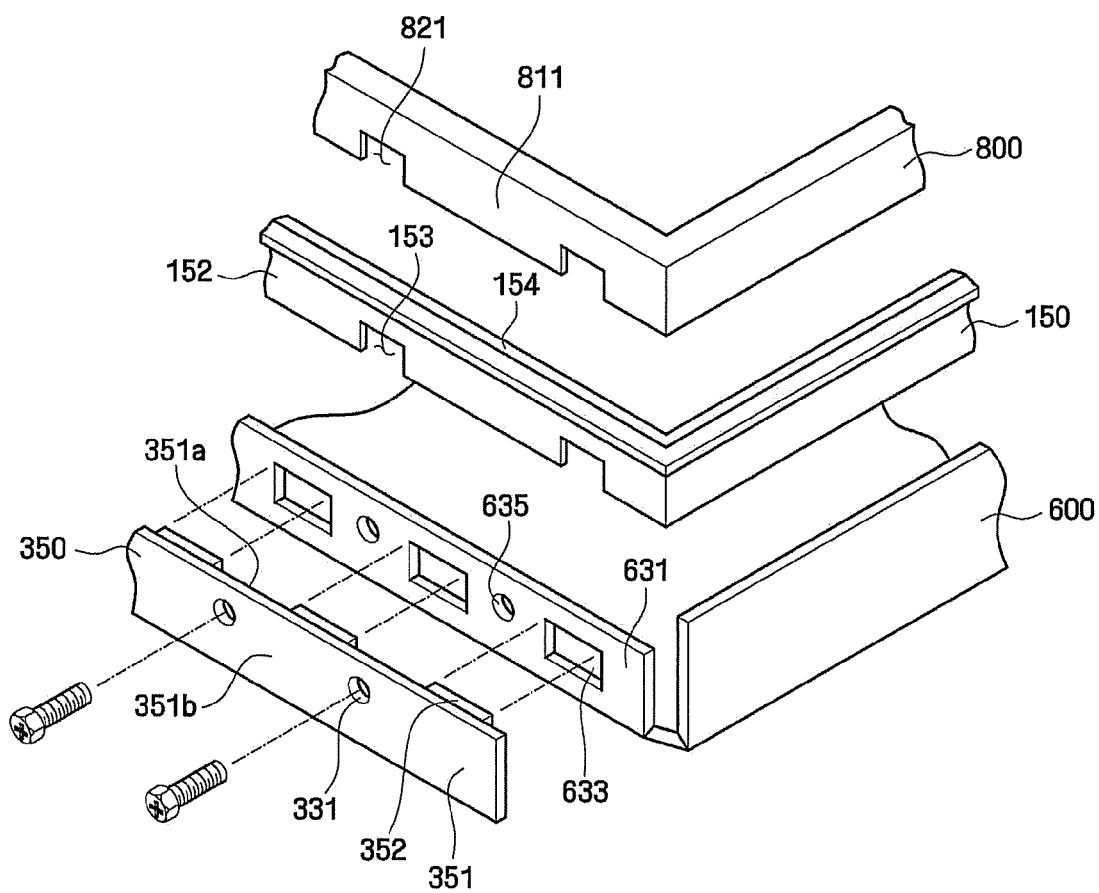
FIGS. 7 and 8 illustrate an exemplary embodiment of a state in which elements, including a light source unit of the display device, of FIG. 6A are coupled to each other.
Figure 8:
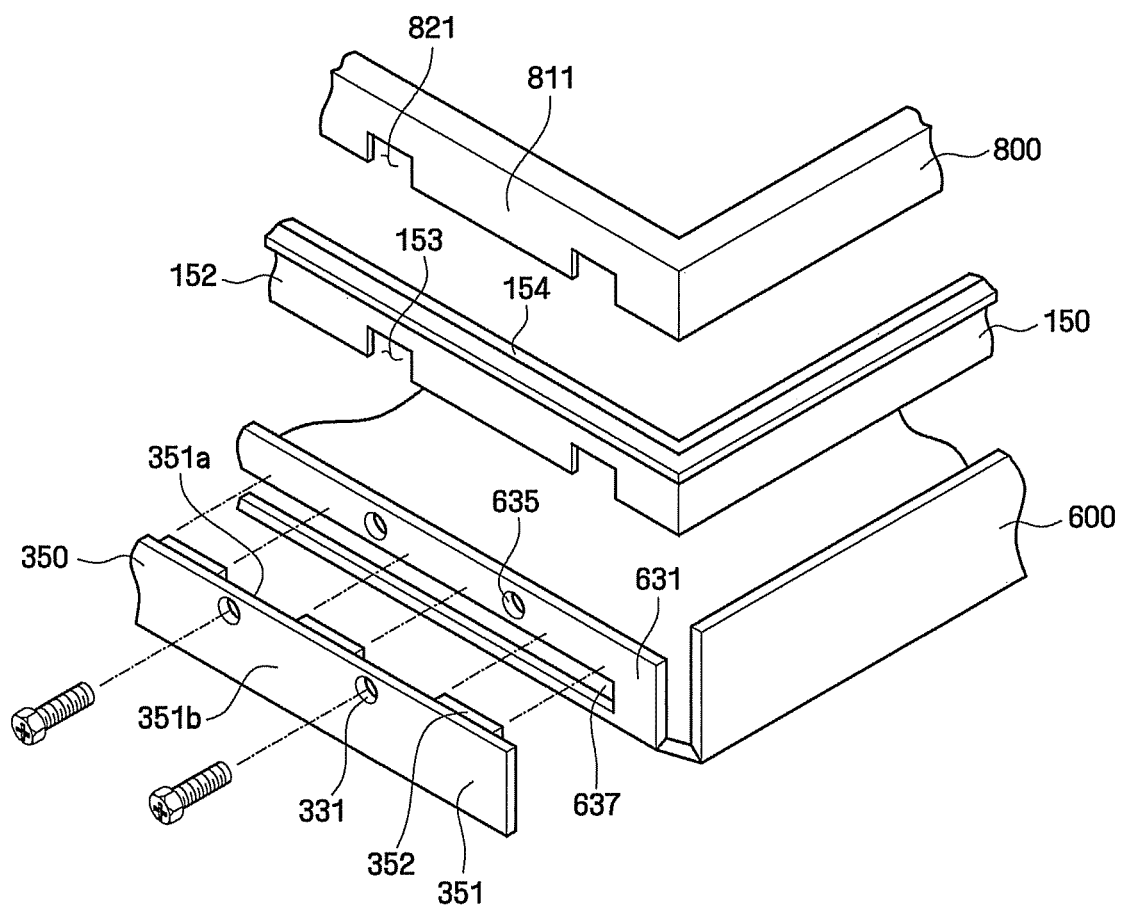
Figure 9:
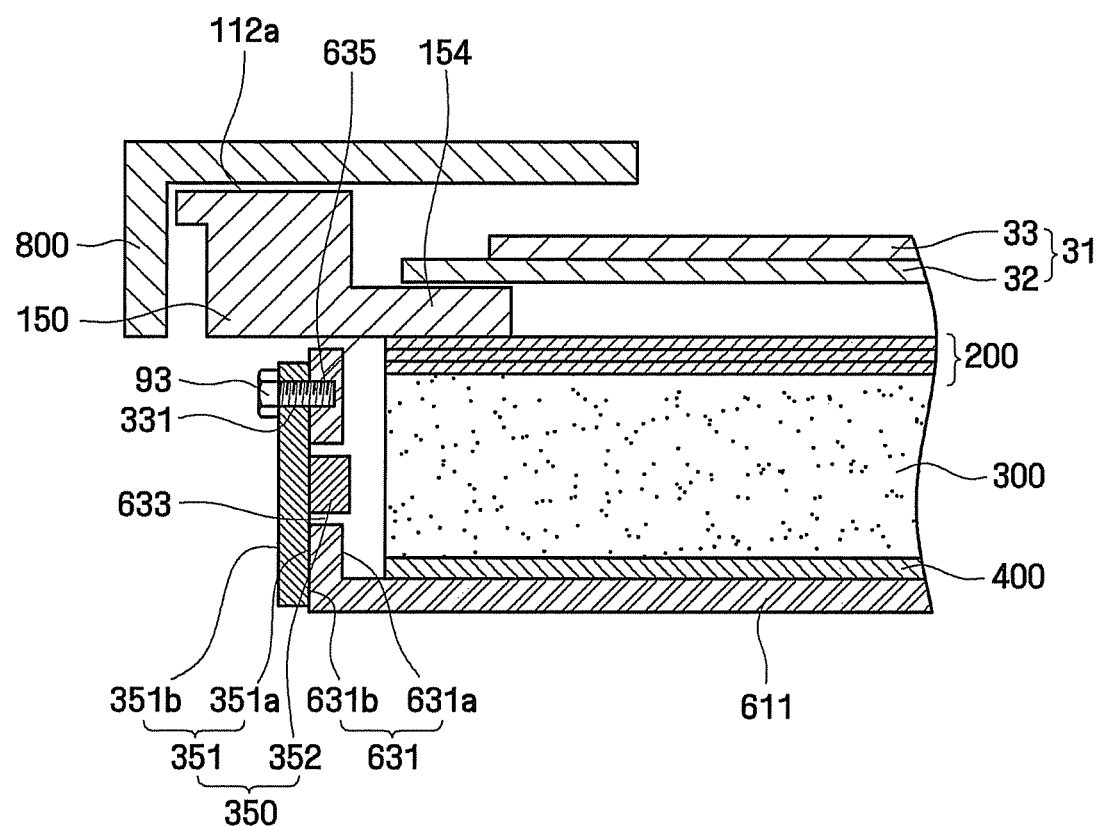
FIG. 9 is a cross-sectional view of the display device taken along line III-III' of FIG. 6A.

FIG. 6A is an exploded perspective view of another exemplary embodiment of a display device according to the invention, FIG. 6B is an exploded perspective view illustrating a modified exemplary embodiment of the display device shown in FIG. 6A, FIGS. 7 and 8 illustrate an exemplary embodiment of a state in which elements including a light source unit of the display device of FIG. 6A are coupled to each other, and FIG. 9 is a cross-sectional view of the display device taken along line III-III' of FIG. 6A. For convenience of explanation, elements each having the same function for describing the previous embodiment are respectively identified by the same reference numerals, and their repetitive description will not be given.

Referring to FIGS. 6A, 7 through 9, a display device 2_1 according to the illustrated embodiment of the invention includes an upper receptacle 800, an intermediate frame 150, and a lower receptacle 600.

The lower receptacle 600 includes a bottom plate 611, and sidewalls 631 respectively extending in the first and second directions. The sidewalls 631 may be formed by bending an end portion of the bottom plate 611, such that the sidewalls 631 and the bottom plate 611 collectively form a single unitary indivisible lower receptacle 600. In other words, the sidewalls 631 may continuously extend from the bottom plate 611. Each of the sidewalls 631 includes an internal surface 631a and an external surface 631b.

Each sidewall 631 further includes a first hole 633, and may include a plurality of the first hole 633. The first hole 633 may be considered an enclosed opening in the sidewall 631, such that the sidewall 631 solely define the enclosed first hole 633.

As described above, the light source unit 350 includes the alignment plate 351 and the point light source 352. The alignment plate 351 includes the first surface 351a and the second surface 351b. The point light source 352 is disposed on the first surface 351a of the alignment plate 351.

The light source unit 350 is coupled with the sidewalls 631, so that the external surface 631b of the sidewall 631 and the first surface 351a of the alignment plate 351 may contact each other. In contrast, the exemplary embodiments in FIGS. 1A through 4 include the second surface 351b of the light source unit 350 contacting the sidewall 531 of the lower receptacle 500.

The point light source 352 of the light source unit 350 is inserted into the first hole 633, such that a distal end of the point light source 352 is disposed further than the internal surface 631a of the sidewall 631. A length of the point source light 352 from the first surface 351a to a distal end of the point light source 352 is larger than a thickness of the sidewall 631 through which the hole 633 is extended. Dimensions, such as a width of the first hole 633 taken in the first direction and a third direction orthogonal to the first and second directions, may be the same as or greater than a width of the point light source 352, so that the point light source 352 may be inserted into the first hole 633. When a plurality of the point light source 352 is disposed on the alignment plate 351, a plurality of the first hole 633 may be disposed in a single sidewall 631, such that a number of first holes 633 correspond to a number of the point light sources 352.

Conversely, the number of point light sources 352 does not necessarily correspond to the number of first holes 633. That is to say, a group of more than one point light sources 352 may collectively be inserted into one single first hole 633. In an exemplary embodiment in which twelve point light sources 352 are disposed on the alignment plate 351, if two point light sources 352 are inserted into one first hole 633, the number of first holes 633 disposed in the single sidewall 631 may be six. Also, when three point light sources 352 are inserted into one first hole 633, the number of first holes 633 disposed in the single sidewall 631 may be four. In the illustrated embodiment, a plurality of first holes 633 may be separated from one another by a predetermined distance, to be parallel to the lengthwise direction of the sidewalls 631.

Referring to FIG. 8, although a plurality of point light sources 352 are disposed on the alignment plate 351, only one continuous first hole 637 may be disposed in the single sidewall 631. In other words, all of the plurality of point light sources 352 may be inserted into one single first hole 637. The first hole 637 may be disposed to extend parallel to the lengthwise direction of the alignment plate 351 or the sidewall 631.

The light source unit 350 and the sidewall 631 may be coupled with each other in various manners. A coupling manner in which the light source unit 350 and the sidewall 631 are coupled with each other using a fixing member 93, such as a screw, will now be described by way of an exemplary embodiment.

The light source unit 350 includes a first fastening portion 331 so as to configured for coupling with the sidewall 631. The first fastening portion 331 may be disposed in the form of a hole, through which a portion of the alignment plate 351 is perforated, so that the screw 93 may be coupled with the first fastening portion 331.

The sidewall 631 includes a second fastening portion 635. The screw 93 that has passed through the first fastening portion 331 is coupled with the second fastening portion 635. The second fastening portion 635 may be disposed in the form of a groove in which a portion of the sidewall 631 is indented. The first and second fastening portions 331 and 635 may be considered an enclosed opening in the alignment plate 351 and the sidewall 631, respectively, such that the first alignment plate 351 and the sidewall 631 solely define the enclosed first and second fastening portions 331 and 635.

As a result, the light source unit 350 and the lower receptacle 600 may be coupled with each other solely by the first fastening portion 331, the screw 93 and the second fastening portion 635.

In the display device 2_1 of FIG. 6A, the light source unit 350 is coupled to face the external surface 631b of the sidewall 631, so that light emitted from the point light source 352 of the light source unit 350 may be uniformly mixed. In other words, in the display device 2_1 of FIG. 6A, the point light source 352 of the light source unit 350 is retreated from the LGP 300 by a distance that corresponds to the sum of a thickness of the alignment plate 351 and a thickness of the sidewall 631, as compared to an embodiment where the light source unit 350 is coupled with the internal surface 631a of the sidewall 631, so that a space in which light emitted from the point light source 352 is uniformly mixed may be formed by the retreated distance. Accordingly, the display device 2_1 having improved display quality can be achieved.

Referring to FIGS. 6A and 7 through 9, the intermediate frame 150 includes a first sidewall portion 152, a first cutting portion 153, and a seating portion 154. The intermediate frame 150 according to the illustrated embodiment is substantially the same as the intermediate frame 100 of FIG. 1A, and thus, repeated descriptions thereof will not be given herein.

The first sidewall portion 152 is disposed to face the sidewall 631 of the lower receptacle 600. The first cutting portion 153 is disposed in the first sidewall portion 152 and defined solely by the sidewall portion 152. Also, the first cutting portion 152 is disposed, so that the first fastening portion 331 of the light source unit 350 may be exposed to the outside of the display device 2_1. The first cutting portion 153 may be indented extending from a bottom end portion to a top end portion of the first sidewall portion 152.

Referring to FIGS. 6A and 7 through 9, the upper receptacle 800 includes a second sidewall portion 811 and a second cutting portion 821.

The second sidewall portion 811 faces the first sidewall portion 152 of the intermediate frame 150. The second cutting portion 821 is disposed in the second sidewall portion 811. Also, the second cutting portion 821 overlaps with and is aligned with the first cutting portion 153 of the intermediate frame 150. The second cutting portion 821 may be indented extending from a bottom end portion to a top end portion of the second sidewall portion 811. A top of the first and second cutting portions 153 and 821 is disposed above a top of the first fastening portion 331 of the light source unit 350. As illustrated in FIGS. 7 and 9, no portion of the first and second sidewall portions 152 and 811 at the first and second cutting portions 153 and 821, respectively, overlap the first fastening portion 331.

When the light source unit 350 is assembled with the lower receptacle 600, portions of the first sidewall portion 152 between adjacent first cutting portions 153, may overlap a portion of the alignment plate 351 between adjacent first fastening portions 331, such that the light source unit 350 is disposed between the portions of the first sidewall 152 and the sidewall 631.

The first fastening portion 331 of the light source unit 350 is exposed to the outside of the display device 2_1 by the aligned first cutting portion 153 and the second cutting portion 821, so that the light source unit 350 may be separated from the lower receptacle 600 without disassembling the intermediate frame 150 or the upper receptacle 800. Since the first fastening portion 331 of the light source unit 350 is exposed to the outside of the display device 2_1, the fixing member 93 can be accessed to be loosened or removed from the first fastening portion 331 and/or the second fastening portion 635. Once the fixing member 93 has been sufficiently detached, the light source unit 350 can be moved from between the portions of the first sidewall portion 152 and the sidewall 631, such as moving the light source unit 350 in a downward direction (e.g., towards the rear of the display device 2_1. Thus, the light source unit 350 may be easily replaced with a new one.

As described above, the lower receptacle 600 of FIG. 6A is an undivided one body, unlike the lower receptacle 500 of FIG. 1A. However, the invention is not limited to this configuration. The lower receptacle 600 of FIG. 6A may be divided into the first receiving portion 501 and the second receiving portion 502 like in the lower receiving portion 500 of FIG. 1A.

FIG. 6B is an exploded perspective view of a display device 2_2 according to a modified exemplary embodiment of the display device of FIG. 6A. The display device 2_2 according to the illustrated embodiment is the same as the display device 2_1 of FIG. 6A, except that a first hole 633 is disposed only in one of sidewalls extending from a bottom plate 612 of lower receptacle 610, a light source unit 350 is disposed only at one side of the LGP 310 and the LGP 310 is of a wedge type. Thus, repeated descriptions thereof will not be given herein. The invention is not limited to this, and the LGP 310 may be of a planar type.

Since the aligned first cutting portion 153 and the second cutting portion 821 provides direct access to the first fastening portion 331 of the light source unit 350, only a limited portion of the display device 2_1 and 2_2 needs to be disassembled from a remainder of the display device 2_1 and 2_2, to access the light source unit 350. Consequently, the light source unit 350 is detachable from the lower receptacle 600 and 610, without disassembling or removing a whole of the backlight assembly 10, and any portion of the light source unit 350 may be easily repaired or replaced.

Next, another exemplary embodiment of a display device according to the invention will be described with reference to FIGS. 10A through 15.

Figure 10A:
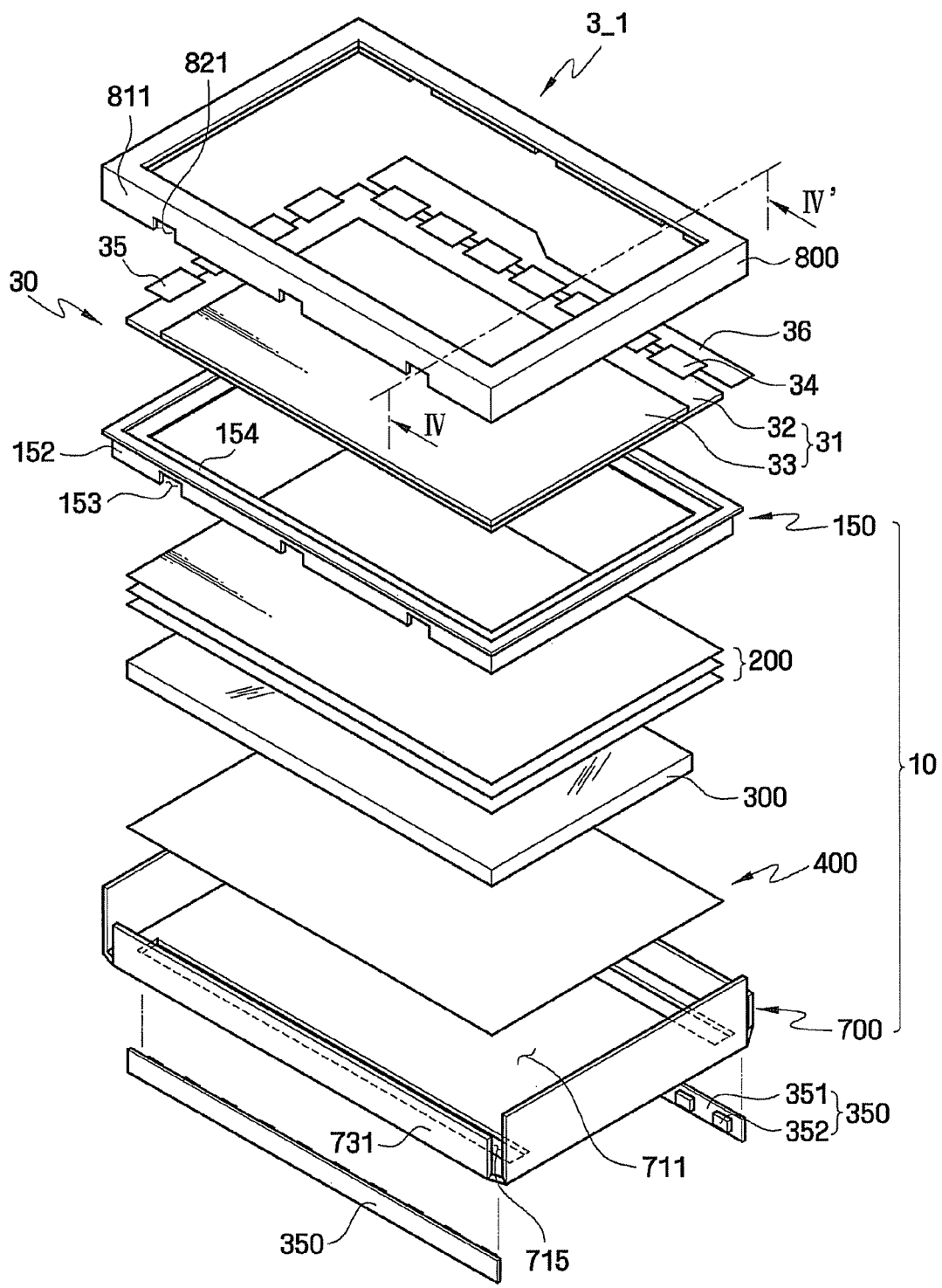
FIG. 10A is an exploded perspective view of another exemplary embodiment of a display device, according to the invention.
Figure 10B:
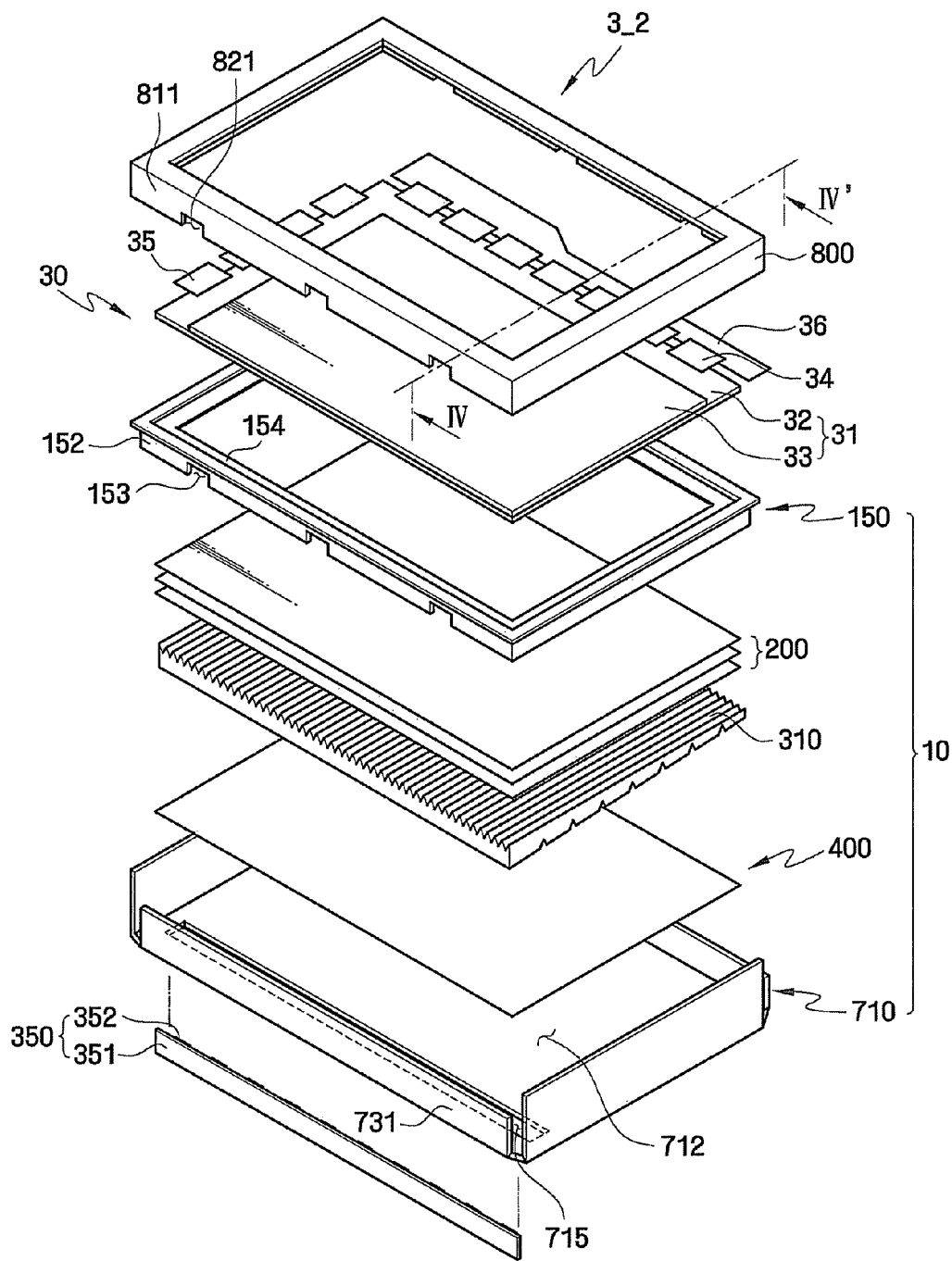
FIG. 10B is an exploded perspective view illustrating a modified exemplary embodiment of the display device shown in FIG. 10A.
Figure 11:
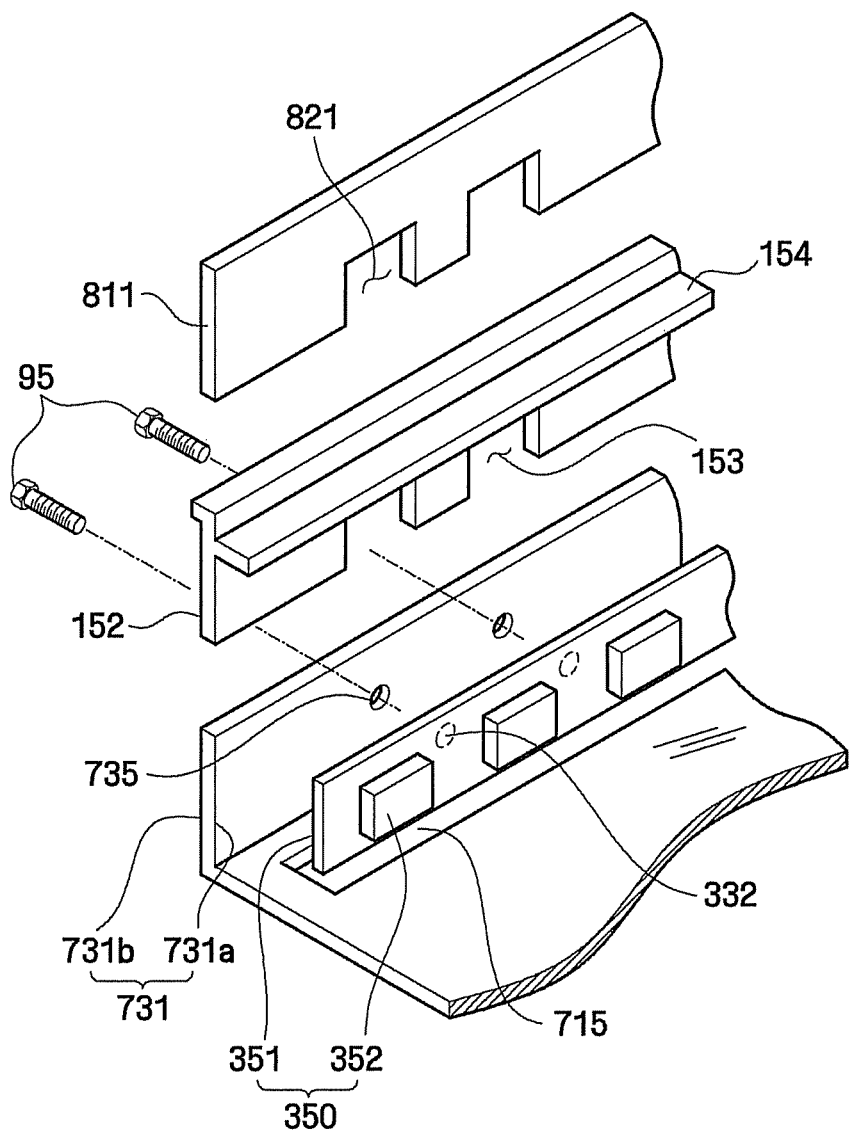
FIGS. 11 and 12 illustrate an exemplary embodiment of a state in which elements of the display device of FIG. 10A are coupled to each other.
Figure 12:
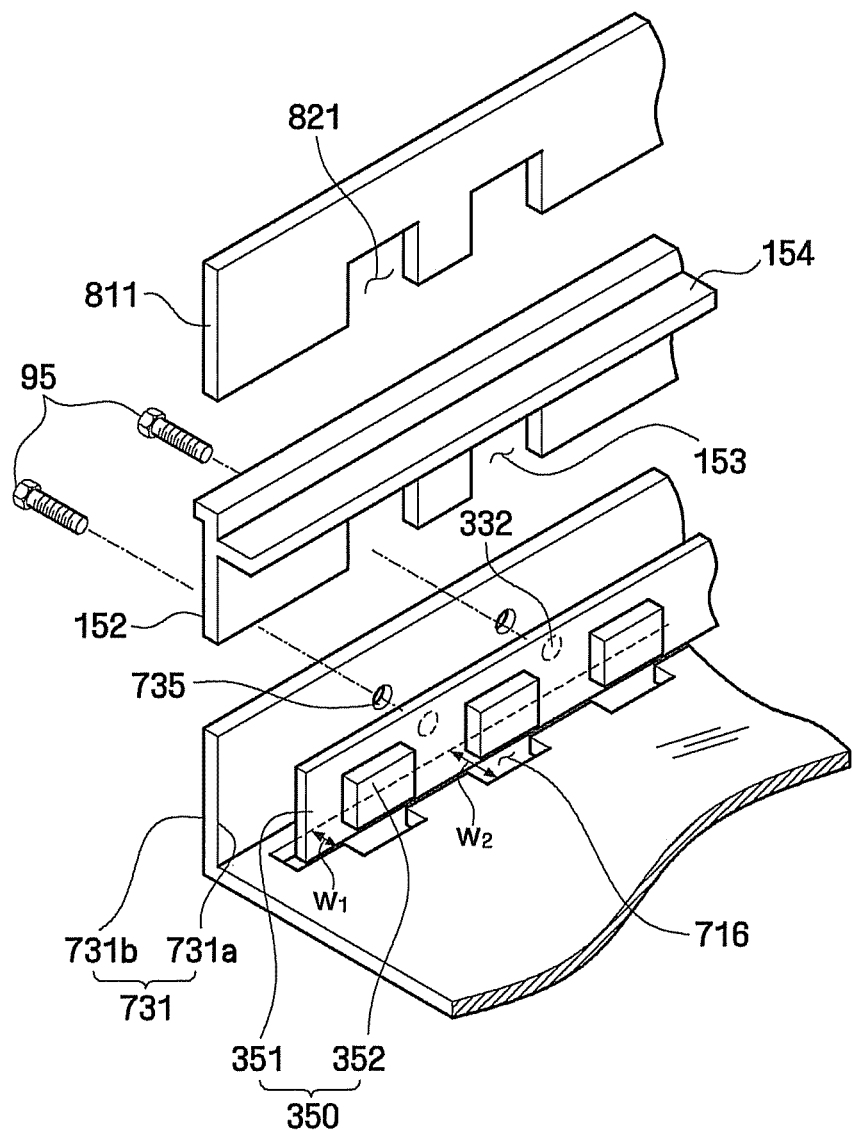
Figure 13:
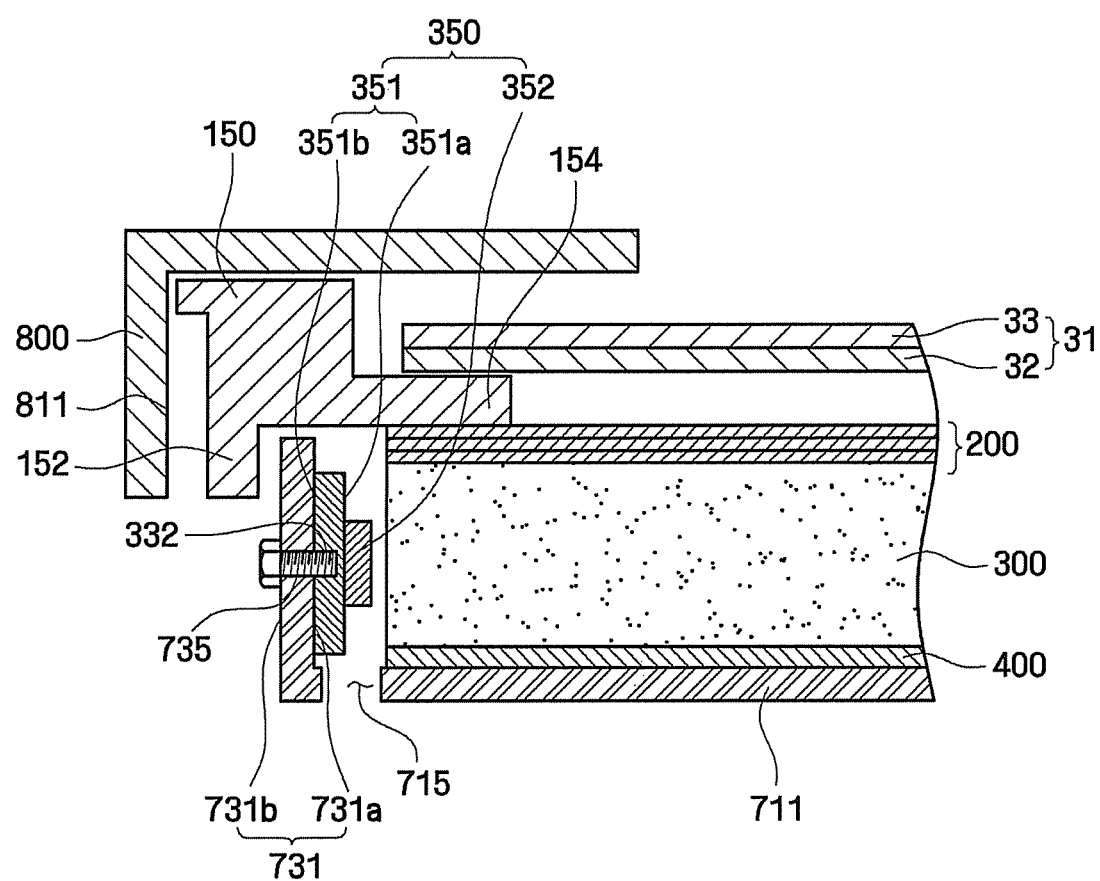
FIG. 13 is a cross-sectional view of the display device taken along line IV-IV' of FIG. 10A.
Figure 14:
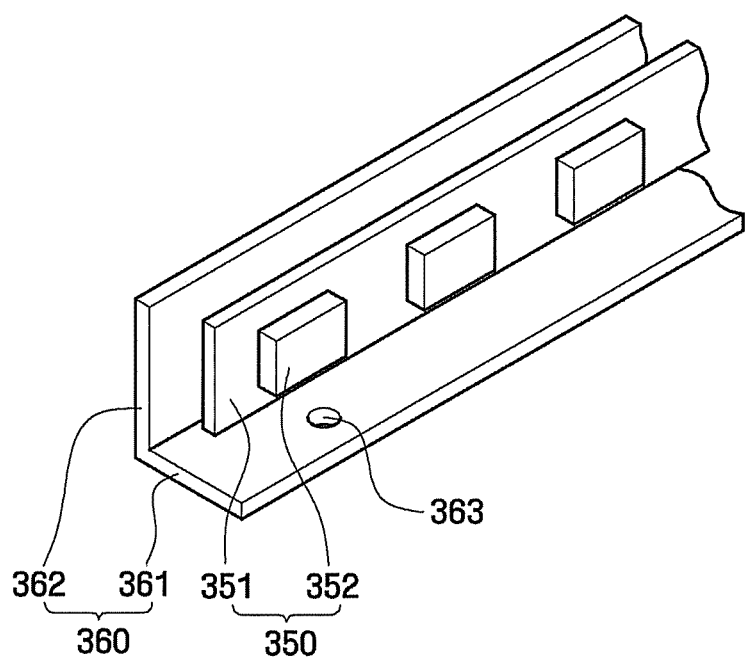
FIG. 14 illustrates another exemplary embodiment of a light source unit.
Figure 15:
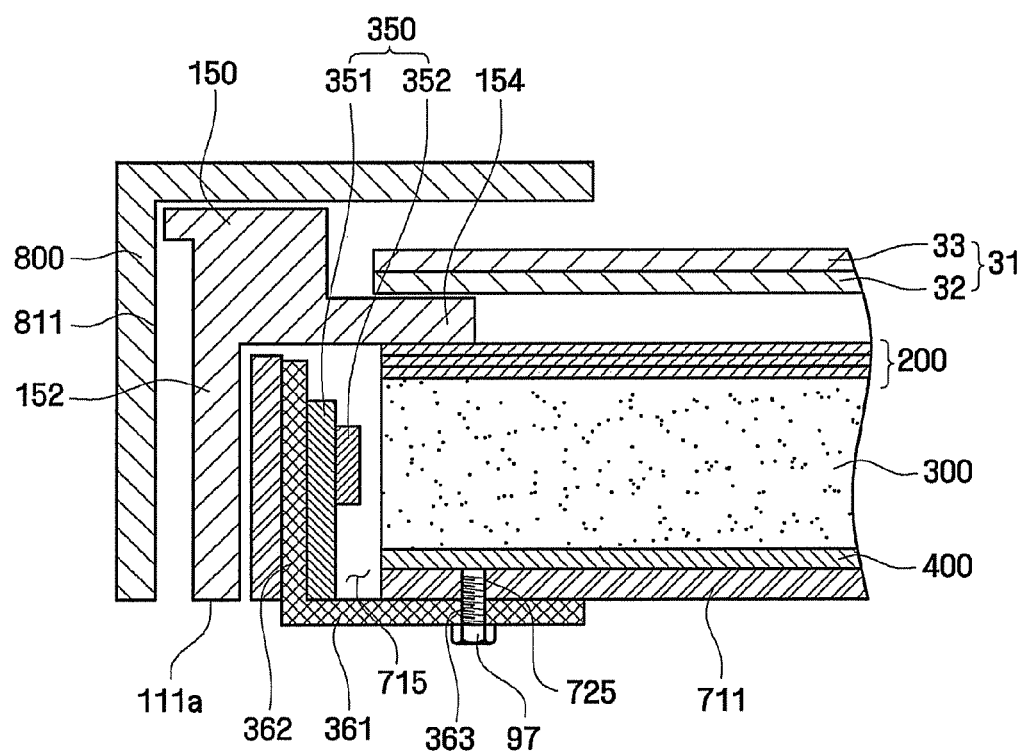
FIG. 15 is a cross-sectional view illustrating another exemplary embodiment of a display device, which includes the light source unit of FIG. 14.

FIG. 10A is an exploded perspective view of another exemplary embodiment of a display device according to the invention, FIG. 10B is an exploded perspective view illustrating a modified exemplary embodiment of the display device shown in FIG. 10A, FIGS. 11 and 12 illustrate an exemplary embodiment of a state in which elements of the display device of FIG. 10A are coupled to each other, and FIG. 13 is a cross-sectional view of the display device taken along line IV-IV' of FIG. 10A. FIG. 14 illustrates another exemplary embodiment of a light source unit, and FIG. 15 is a cross-sectional view illustrating another exemplary embodiment of a display device, including the light source unit in FIG. 14. For convenience of explanation, elements each having the same function for describing the earlier described embodiments are respectively identified by the same reference numerals, and their repetitive description will not be given.

Referring to FIGS. 10A through 13, a display device 3_1 according to the illustrated embodiment of the invention includes the upper receptacle 800, the intermediate frame 150, and a lower receptacle 700.

The lower receptacle 700 includes a bottom plate 711 and sidewalls 731. The sidewalls 731 may be formed by bending an end portion of the bottom plate 711, such that the sidewalls 731 and the bottom plate 711 collectively form a single unitary indivisible lower receptacle 700. In other words, the sidewalls 731 may continuously extend from the bottom plate 711. Each of the sidewalls 731 includes an internal surface 731a and an external surface 731b.

A second hole 715 is disposed in the bottom plate 711. The second hole 715 is disposed to be parallel to the lengthwise direction of the sidewalls 731. The second hole 715 may be configured to be a sufficient width in the first and second directions, through which the light source unit 350 passes through the second hole 715. In other words, the second hole 715 may be disposed to have a width that corresponds to the sum of a thickness of an alignment plate 351 of a light source unit 350 and a thickness of a point light source 352 of the light source unit 350, the thicknesses taken in the second direction of the display device 3_1 and perpendicular to the alignment plate 351.

As illustrated in FIG. 11, the width of the second hole 715 is substantially uniform along the lengthwise direction of the sidewalls 731. Referring to FIG. 12, the second hole 716 may include a first width $W_1$ and a second width $W_2$. The first width $W_1$ may be equal to or greater than the thickness of only the alignment plate 351. The second width $W_2$ may be equal to or greater than the sum of the thickness of the alignment plate 351 and the thickness of the point light source 352. In the illustrated embodiment, the first width $W_1$ may be smaller than the second width $W_2$. The first width $W_1$ and the second width $W_2$ are connected to each other and constitute one continuous second hole 715. The second holes 715 and 716 may be considered enclosed opening in the bottom plate 711 of the lower receptacle 700, such that the bottom plate 711 solely defines the enclosed second holes 715 and 716.

Referring to FIGS. 11 through 13, a whole of the light source unit 350 that completely passes through the second hole 715 is coupled with the lower receptacle 700. In the illustrated embodiment, the light source unit 350 and the lower receptacle 700 are coupled with each other, so that the second surface 351b of the alignment plate 351 may contact the internal surface 731a of the sidewall 731.

The light source unit 350 and the sidewall 731 may be coupled with each other in various manners. In an exemplary embodiment, the light source unit 350 and the sidewall 731 are coupled with each other by means of a fixing member 95, such as a screw, which will now be described.

The sidewall 731 includes a first fastening portion 735 to allow the sidewall 731 to be coupled with the light source unit 350. The first fastening portion 735 may be disposed in the form of a hole, through which a portion of the sidewall 731 is completely perforated, so that the screw 95 may be coupled with the first fastening portion 735. The first fastening portion 735 may be considered an enclosed opening in the sidewall 731, such that the sidewall 731 solely define the enclosed first fastening portion 735.

The light source unit 350 includes a second fastening portion 332. The screw 95 that has passed through the first fastening portion 735 is coupled with the second fastening portion 332. The second fastening portion 332 may be disposed in the form of a groove in which a portion of the alignment plate 351 is indented. The light source unit 350 and the lower receptacle 700 may be coupled with each other solely by the first fastening portion 735, the screw 95, and the second fastening portion 332.

Referring to FIGS. 10A through 13, the intermediate frame 150 includes the first sidewall portion 152, the first cutting portion 153, and the seating portion 154. Also, the upper receptacle 800 includes the second sidewall portion 811 and the second cutting portion 821. The intermediate frame 150 and the upper receptacle 800 of FIG. 10A are substantially the same as the intermediate frame 150 and the upper receptacle 800 of FIG. 6A, except that the first fastening portion 735 of the sidewall 731 of the lower receptacle 700 is exposed by the first cutting portion 153 and the second cutting portion 821, and thus, repeated descriptions thereof will not be given herein. [김준석1]

The first fastening portion 735 of the sidewall 731 is exposed to the outside by means of the first cutting portion 153 and the second cutting portion 821, so that the light source unit 350 may be separated from the lower receptacle 700 without disassembling the intermediate frame 150 or the upper receptacle 800. Since the first fastening portion 735 of the sidewall 731 is exposed to the outside of the display device 3_1, the fixing member 95 can be accessed to be loosened or removed from the first fastening portion 735 and/or the second fastening portion 332. Once the fixing member 95 has been sufficiently detached, the light source unit 350 can be moved from an inner area (e.g., receiving space) of the lower receptacle 700 to an outside of the lower receptacle 700 and the display device 3_1, such as moving the light source unit 350 through the second hole 715 in a downward direction (e.g., towards the rear of the display device 3_1), thereby enabling easy replacement of the light source unit 350.

Referring to FIGS. 10A, 14, and 15, another exemplary embodiment of a light source unit 350 further includes a support member 360.

The support member 360 includes a support plate 361 and a support wall 362. The support wall 362 may be formed by bending an end portion of the support plate 361, such that the support plate 361 and the support wall 362 collectively form a unitary indivisible member. In other words, the support wall 362 may continuously extend from the support plate 361. The alignment plate 351 is disposed on the support member 360. In particular, the alignment plate 351 may be disposed on the support wall 362. The support member 360 and the light source unit 350 collectively form an individual and separate member from a remainder of a display device.

An entire of the support wall 362, the alignment plate 351, and the point light source 352 disposed on the alignment plate 351 pass through the second hole 715 of the bottom plate 711 of the lower receptacle 700. Thereafter, the support member 360 and the lower receptacle 700 are coupled with each other, so that the light source unit 350 may be accommodated in the lower receptacle 700.

The support member 360 and the lower receptacle 700 may be coupled with each other in various manners. In an exemplary embodiment, the support member 360 and the lower receptacle 700 are coupled with each other by means of a fixing member 97, such as a screw, which will now be described.

The support member 360 includes a first fastening portion 363 disposed in the support plate 361, so that the support member 360 may be coupled with the lower receptacle 700. The first fastening portion 363 may be disposed in the form of a hole, through which a portion of the support plate 361 is perforated, so that the screw 97 may be coupled with the first fastening portion 363.

The lower receptacle 700 includes a second fastening portion 725. In the illustrated embodiment, the second fastening portion 725 is disposed in the bottom plate 711 of the lower receptacle 700. The screw 97 that has passed through the first fastening portion 363 is coupled with the second fastening portion 725. The second fastening portion 725 may be disposed in the form of a groove in which a portion of the bottom plate 711 is indented. In other words, the bottom plate 711 and the support plate 361 may be coupled with each other.

As a result, the light source unit 350 and the lower receptacle 700 may be coupled with each other solely by the first fastening portion 363, the screw 97 and the second fastening portion 725.

The light source unit 350 may be separated from the lower receptacle 700 without disassembling the intermediate frame 150 or the upper receptacle 800 by means of the first fastening portion 363 of the support plate 361. Since the first fastening portion 363 of the support member 360 is exposed to the outside of the display device, the fixing member 97 can be accessed to be loosened or removed from the first fastening portion 363 and/or the second fastening portion 725. Once the fixing member 97 has been sufficiently detached, the light source unit 350 can be moved in a downward direction (e.g., towards the rear of the display device), thereby enabling easy replacement of the light source unit 350.

As described above, the lower receptacle 700 that is used in FIGS. 10A and 15 is an undivided on body, unlike in the lower receptacle 500 of FIG. 1A. However, the invention is not limited to this configuration. The lower receptacle 700 that is used in FIGS. 10A and 15 may be divided into the first receiving portion 501 and the second receiving portion 502 like in the lower receptacle 500 of FIG. 1A.

FIG. 10B is an exploded perspective view of a display device 3_2 according to a modified exemplary embodiment of the display device of FIG. 10A. The display device 3_2 according to the illustrated embodiment is the same as the display device 3_1 of FIG. 10A, except that the second hole 715 is disposed only in one end of the bottom plate 712 of a lower receptacle 710, the light source unit 350 is disposed at one side of the LGP 310 and the LGP 310 is of a wedge type. Thus, repeated descriptions thereof will not be given herein. The invention is not limited to this, and the LGP 310 may be of a planar type.

Since the aligned first cutting portion 153 and the second cutting portion 821 provides direct access to the first fastening portion 735 of lower receptacle 700 and 701, only a limited portion of the display device 3_1 and 3_2 needs to be disassembled from a remainder of the display device 3_1 and 3_2, to access the light source unit 350. Consequently, the light source unit 350 is detachable from the lower receptacle 700 and 710, without disassembling or removing a whole of the backlight assembly 10, and any portion of the light source unit 350 may be easily repaired or replaced.

While the invention has been particularly shown and described with reference to exemplary embodiments thereof, it will be understood by those of ordinary skill in the art that various changes in form and details may be made therein without departing from the spirit and scope of the invention as defined by the following claims. It is therefore desired that the exemplary embodiments be considered in all respects as illustrative and not restrictive, reference being made to the appended claims rather than the foregoing description to indicate the scope of the invention.

What is claimed is:

1. A display device comprising:
a display panel which displays images;
a lower receptacle which includes:
   a unitary indivisible first receiving portion including a first bottom plate overlapping the display panel, and sidewalls extending directly from the first bottom plate and defining a receiving space with the first bottom plate, and
   a unitary indivisible second receiving portion separate from the first receiving portion and including a second bottom plate overlapping the display panel;
an intermediate frame on which the display panel is seated, and comprising a sidewall portion in the receiving space and facing a sidewall of the first receiving portion, the sidewall portion comprising a bottom end surface and a top end surface; and
a light source unit disposed between the intermediate frame and the lower receptacle, the light source unit including an alignment plate, and a point light source mounted on the alignment plate,
wherein
the alignment plate of the light source unit and the sidewall portion of the intermediate frame contact internal surfaces of the sidewalls of the first receiving portion, the internal surfaces exposed to the receiving space of the first receiving portion, and
the first receiving portion is removably disposed with the intermediate frame.

2. The display device of claim 1, wherein
the alignment plate includes a first surface and a second surface opposing the first surface,
each of the sidewalls of the first receiving portion includes an internal surface exposed to the receiving space, and an external surface opposing the internal surface,
the point light source is mounted on the first surface of the alignment plate, and
the internal surface of a first sidewall of the first receiving portion and the second surface of the alignment plate contact each other.

3. The display device of claim 1, wherein
the first bottom plate of the first receiving portion faces and is directly coupled with the bottom end surface of the intermediate frame sidewall portion in the receiving space.

4. The display device of claim 1, wherein the alignment plate includes a printed circuit board.

5. The display device of claim 1, wherein the first receiving portion and the intermediate frame are coupled with each other by means of a fixing member.

6. The display device of claim 5, wherein the fixing member is a screw.

7. The display device of claim 1, wherein the lower receptacle further includes a unitary indivisible third receiving portion including a third bottom plate and sidewalls.

8. The display device of claim 1, wherein the intermediate frame further comprises a seating portion on which the display panel is seated.

9. A display device comprising:
a display panel which displays images;
a lower receptacle which includes:
   a unitary indivisible first receiving portion including a first bottom plate, and sidewalls defining a receiving space with the first bottom plate, the sidewalls comprising a first sidewall and a second sidewall, and
   a unitary indivisible second receiving portion separate from the first receiving portion and including a second bottom plate;

an intermediate frame on which the display panel is seated, and comprising a first sidewall portion and a second sidewall portion, the first sidewall portion facing an external surface of the first sidewall of the first receiving portion and the second sidewall portion in the receiving space and facing an internal surface of the second sidewall, the internal surface exposed to the receiving space of the first receiving portion; and a light source unit disposed between the intermediate frame and the lower receptacle, wherein at least a part of the light source unit contacts internal surfaces of the sidewalls, the internal surfaces exposed to the receiving space of the first receiving portion, and the first receiving portion is removably disposed with the intermediate frame.

10. The display device of claim 9, wherein the sidewalls extend from the first bottom plate.

11. The display device of claim 9, wherein the first receiving portion and the intermediate frame are coupled with each other by means of a fixing member.

12. The display device of claim 11, wherein the fixing member is a screw.

13. The display device of claim 9, wherein the lower receptacle further includes a unitary indivisible third receiving portion including a third bottom plate and sidewalls.

14. The display device of claim 9, wherein each of the first sidewall portion and the second sidewall portion comprises a bottom end surface and a top end surface.

15. The display device of claim 9, wherein the light source unit includes an alignment plate, and a point light source mounted on the alignment plate.

16. The display device of claim 14, wherein the first bottom plate of the first receiving portion is directly coupled with the bottom end surface of the second sidewall portion of the intermediate frame, which is in the receiving space.

17. The display device of claim 15, wherein the alignment plate includes a printed circuit board.

18. The display device of claim 15, wherein the alignment plate includes a first surface and a second surface opposing the first surface, and each of the sidewalls of the first receiving portion includes an internal surface exposed to the receiving space, and an external surface, and the point light source is mounted on the first surface of the alignment plate, and the internal surface of the first sidewall of the first receiving portion and the second surface of the alignment plate contact each other.

* * * * *